United States Patent Office 2,836,632
Patented May 27, 1958

2,836,632

PRODUCTION OF AROMATIC HYDROCARBONS FROM DIARYLALKANES

Lloyd C. Fetterly, El Cerrito, Calif., assignor to Shell Development Company, New York, N. Y., a corporation of Delaware No Drawing. Application December 21, 1953
Serial No. 399,569

20 Claims. (Cl. 260—668)

This invention relates to the production of aryl hydrocarbons having at least one aliphatic nuclear substituent of at least two carbon atoms, and more particularly, to the production of such aryl compounds as those which have a $C_2$-aliphatic hydrocarbon radical attached to an aryl nucleus.

It has been proposed before: (1) to crack 1,1-ditolylethane by heating it in the presence of a Friedel-Crafts catalyst to produce ethyltoluene and toluene; (2) to crack 1,1-ditolylethane, diluted with steam, in the presence of a cracking catalyst such as alumina-silica, zirconia-alumina-silica, titania-alumina-silica, zirconia, titania, thoria-alumina-silica, or a siliceous catalyst coated on a non-porous carrier, to produce p-methylstyrene (vinyltoluene) and toluene; and (3) to dehydrogenate 1,1-ditolylethane in the presence of a metal chromite (copper chromite) or of a metal oxide such as of nickel, iron and cobalt, to produce 1,1-ditolylethylene. Similar proposals have been made with respect to other 1,1-dialkarylethanes, such as the dixylylethanes, and also in general diarylalkanes having at least two carbon atoms in the alkane chain and having the aryl groups attached to the same carbon atom.

It is an object of the present invention to provide an improved process for the conversion of such diarylalkanes into alkyl and/or alkenyl aromatic compounds. Another object is to provide a flexible process which may be readily varied to give conversion primarily to the saturated alkylaromatic compounds, or primarily to unsaturated alkenyl-aromatic compounds or to give any desired ratios of the two.

Now, in accordance with the present invention, these and other objects are attained by contacting the diarylalkane for a short contact period, and at an elevated temperature with a composite catalyst comprising a high melting inorganic substance having acidic properties and a dehydrogenation catalyst, and in the presence of free hydrogen.

The portion of the composite catalyst comprising the high melting inorganic acidic material, which is preferably an inorganic oxide or sulfide, such as a siliceous material, may be described generally as one which promotes "ionic" conversions. Representative substances are those which have already been proposed as catalysts for the cracking of ditolylethane to produce p-methylstyrene, for example, a hydrated aluminum silicate, alumina-silica, zirconia, titania, zirconia-alumina-silica, titania-alumina-silica, thoria-alumina-silica. The high melting inorganic oxide- or sulfide-containing portion of the catalyst may be a synthetic material or may be of natural origin, such as a suitable naturally-occurring clay, which may or may not have been given a special treatment, such as an acid treatment, in order to enhance its acidity, and hence its "ionic," character. High melting inorganic sulfides are illustrated by the metal sulfide catalysts, such as molybdenum disulfide, nickel-tungsten-sulfide, and the like.

Various dehydrogenation catalytic materials are suitable as the other essential component of the composite catalyst. Nickel is a particularly effective metal for the present process, with other metals, such as the platinum group metals palladium, platinum and rhodium being suitable, and also the other members, iron and cobalt, of the nickel group being effective though less active than nickel. The hydrogenation metals such as nickel are effective here in the presence of hydrogen when they are associated as the sulfide with sulfides of other heavy metals such as tungsten and molybdenum.

The catalytic hydrocracking of the diarylalkane, such as of 1,1-di-p-tolylethane, is readily effected by passing it in vapor phase admixed with free hydrogen over a mass of catalyst particles, such as of reduced nickel supported on an acidic clay, such as acidified Attapulgas clay, while maintaining the catalyst mass in the reaction zone at a suitable elevated temperature, the pressure at a suitable level and the proportion of hydrogen at a suitable value, depending on whether the saturated or unsaturated $C_2$-benzene compound is desired as the predominating component of the $C_9$-aromatic hydrocarbon product.

Thus, when the saturated $C_1$-$C_2$-benzene compound, methylethyl-benzene, is desired as the predominant product $C_9$-component, a temperature in the order of 350° C. and a pressure of the order of 250 p. s. i. g. are particularly effective for the purpose. For instance, when 1,1-di-p-tolylethane was cracked over a catalyst containing 10% Ni (metallic) on acid-treated Attaclay on Aloxite at 350° C., 250 p. s. i. g. pressure, at a liquid hourly space velocity (LHSV) of 20 and admixed with hydrogen in a mole ratio of 25 to 1, hydrogen to alkylate, 95% of the alkylate was converted to p-ethyltoluene (p-methylethylbenzene) and toluene. At the very high throughput rate of 45 (LHSV), the conversion dropped to 50%, this drop in conversion apparently being due to the extremely short contact time. A 70% conversion to p-ethyltoluene and toluene was obtained at 325° C., 270 p. s. i. g., an LHSV of 12 and a mole ratio of hydrogen to alkylate of 10 to 1. A 42% conversion was obtained by hydrocracking over a catalyst of 5% Ni on 10% Attapulgus clay on Aloxite, at 590° C., 260 p. s. i. g. pressure, LHSV of 20 and a feed rate of 22 moles of $H_2$/hr., giving a vapor contact time of 0.6 second. Using a 5% Ni-Attapulgus catalyst, 68% conversion was obtained at 550° C., 530 p. s. i. g. pressure, LHSV of 12.9, moles of $H_2$/hr. of 38.1 and a vapor contact time of 0.5 second. Nearly the same conversion (64%) was obtained with the same catalyst at the same temperature but at 280 p. s. i. g. pressure, LHSV of 22.8, moles of $H_2$/hr. of 45.7 and a vapor contact time reduced to 0.2 second.

Some isomerization may occur during the contact with the acidic catalyst; however, this is readily minimized, if desired, by the use of a weakly acidic catalyst, and/or by the use of a contact time sufficiently low which does not permit of an undue amount of isomerization. On the other hand, in some instances it may be desirable to take advantage of the isomerization activity of the acidic base or support portion of the catalyst to increase the proportion of a different isomer; for example, to produce meta-ethyltoluene from the p,p'-ditolylethane. Thus, 99% conversion of 1,1-di-p-ditolylethane was obtained under the following conditions: 5% Ni on U. O. P. "B" catalyst (a silica-alumina-zirconia catalyst), 485° C., 530 p. s. i. g. pressure, LHSV of alkylate of 5.8, moles $H_2$/hr. of 23.7, vapor contact time of 4.3 seconds. The isomer distribution of the methylethylbenzenes was 7% ortho, 27% meta and 66% para. The ortho- and meta-isomer proportions were reduced to 4% and 7%, respectively at 2 seconds contact time; further reduction of the contact time to 0.1 second gave less than 0.5% of the meta-component.

With the less acidic and lower surface area catalyst, 5% Ni-10% Attapulgus on Aloxite carrier, at 400° C., 280 p. s. i. g., 0.46 seconds contact time (LHSV of 12), 28 moles H₂/hr., a 57% conversion (98–100% yield based on converted material) of the ditolylethane alkylate to ethyltoluene and toluene was realized, with the C₉-aromatic isomer distribution of ortho- 6% wt., meta- 0.5–1% wt. and para- 93–94% wt. When 1,1-bis(p-ethylphenyl)ethane was cracked under the same conditions and over the same catalyst, essentially the same yields and conversions were obtained, and with and isomer distribution of 95–6% para-diethylbenzene, 4% ortho and 0.5% meta. When the reaction temperature was raised in the cracking of the ditolylethane, the meta-isomer content increased to 1.5% at 440° C. (83% conversion) and 4.5% at 550° C. (99% conversion).

With 5% Ni on untreated Merck kaolin the conversion was 85% at 400° C. under the above conditions and 50% at an LHSV of 36, indicating a more active catalyst. Replacement of the 5% Ni with 0.15 and 0.25% platinum, on Attapulgus-Aloxite and on alumina, respectively, gave lower conversions (54 and 89%) under comparable conditions. "Platforming" catalyst (0.55% wt. Pt./0.7% wt. Cl/0.45% wt. SiO₂/Al₂O₃) gave a conversion of 50% at 450° C., 255 p. s. i. g., LHSV of 14 and 14.8 moles H₂/hr.

It is to be seen from the foregoing detailed description of results of hydrocracking of ditolylethane or 1,1-bis(p-ethylphenyl)ethane that hydrocracking in accordance with this invention yields predominantly saturated cracked products when the conversion is effected in the presence of a substantial proportion of hydrogen and at an elevated pressure. When isomerization of product is not desired, the preferred mole ratios of hydrogen to diarylalkane for the production of saturated cracked products are 20 to 50, although ratios as low as about 10 and as high as about 100 may be suitably utilized. The pressures are preferably from about 300 to about 700, and may be as low as about 100 and as high as about 1000. Temperatures of from about 300° C. to about 500° C. can be used, with a temperature of about 350° C. to 450° C. being preferred. These variables are selected to give a contact time of 0.05 to 0.5 second. When isomerization is not important and possibly desirable, contact times as high as 13 seconds may be used. In this case such factors as the hydrogen dilution ratio would be reduced to a preferred 2 to 10 range. It will be understood, of course, that the most effective temperature for a given case will also depend upon the particular hydrogenation metal component present in the catalyst as well as on the acidity of the catalyst.

When the cracking of the diarylalkane is effected in the presence of the same catalysts and also in the presence of hydrogen, but under conditions which are less active for hydrogenation, the corresponding arylalkane is readily obtained as a product of the conversion. Thus, when 1,1-di-p-tolylethane was cracked over a catalyst composite of 5% Ni on 10% Attapulgus on Aloxite, at 560° C. and an LHSV of 12, using one (1) atmosphere of hydrogen pressure, a 45% conversion to p-methylstyrene and toluene was obtained; at 500° C., 35% conversion occurred under otherwise comparable conditions. The product showed only very little hydrogenation.

When 1,1-di-p-tolylethane was cracked at atmospheric pressure over a similar catalyst, but containing 10% Ni, at 550° C., an LHSV of 10 and a mole ratio of hydrogen to ditolylethane of 10 to 1, hydrogen and ditolylethane being the only feed components, a 49% conversion to p-methylstyrene was obtained as average conversion over a one-half hour processing period. This is approximately one and one-half times the conversion of 34% which was obtained under the same conditions except that steam was utilized in place of hydrogen. Furthermore, and entirely unexpectedly, it was found that a combination of steam and hydrogen even at a small ratio (1/10) of either one to the other gave results better than with either component alone. For instance, under the same conditions, except that a mixture of steam and hydrogen was used, at the same mole ratio of total vapor diluent to ditolylethane of 10, the conversion to p-methylstyrene was 58% at a mole ratio of 50:50, steam to hydrogen, and it was 59% at a ratio of 20:80, steam to hydrogen.

1,1-diphenylethane, although more resistant to cracking than the 1,1-di(alkylphenyl)ethanes, was hydrocracked over a Ni-Attapulgite catalyst at 560° C., 1 p. s. i. g. pressure, LHSV of 5, mole ratio of H₂ to diphenylethane of 10 with a 28% conversion to light material; the C₈-aromatic fraction contained 89% styrene and 11% ethylbenzene.

When the 1,1-di-o-tolylethane is hydrocracked under substantially the same conditions as described in the hydrocracking of the 1,1-di-p-tolylethane, ortho-methylethylbenzene and/or ortho-methylstyrene are readily obtained, in addition to toluene. Similarly, mixtures of di-o-tolylethane and di-p-tolylethane yields mixtures of the ortho- and para-isomers of methylethylbenzene and/or methylstyrene. The various 1,1-dixylylethanes yield corresponding dimethylethylbenzenes and/or dimethylstyrenes, whether hydrocracked individually or as mixtures thereof.

1,1-di-(p-tertiarybutylphenyl)ethane gave high yields of p-tert-butylstyrene when cracked over 10% Ni-Attapulgas on Aloxite catalyst at 550° C., LHSV=10, H₂/alkylate=10:1 mole ratio.

As a comparison between the activity of cobalt and nickel as metal component of the catalyst in the process of this invention, acid treated Attaclay (10%) on Aloxite and containing 10% wt. of cobalt gave 60% conversion of ditolylethane to C₉-aromatic product, under conditions (260 p. s. i. g., 350° C.) where 10% wt. nickel on Attaclay-Aloxite gave an excess of 95% conversion.

The foregoing description of various applications of the present invention makes it clear that the invention is applicable broadly to the cracking of diarylalkane hydrocarbons (as already specified) in the presence of hydrogen and an acidic catalyst containing a dehydrogenating catalyst component. Thus, it is applicable as well to the hydrocracking of diarylalkanes such as 1,1-di(p-tolyl)propane, 1,1-di(p-tolyl)butane and 1,1-diphenyloctane.

A particularly advantageous embodiment of the present method, which involves the cracking of the diarylalkanes in the presence of hydrogen, especially under conditions to yield the saturated alkylaromatics, which conversion is highly exothermic, is the provision of an endothermic reaction in the same reaction zone to give an essentially isothermic overall reaction, the endothermic reaction being the dehydrogenation of a corresponding naphthene. The dehydrogenation of the corresponding naphthene to aromatic is effectively accomplished under the same conditions and with the same catalyst as employed for the hydrocracking. For instance, methylcyclohexane is dehydrogenated to toluene, giving three moles of hydrogen per mole of methylcyclohexane, when passed over nickel-Attapulgite-clay, "Platforming" and nickel-tungsten-sulfide catalysts under the foregoing described hydrocracking conditions for the cracking of ditolylethane to ethyltoluene and toluene, the dehydrogenation of the naphthene being highly endothermic. When an equimolar mixture of methyl cyclohexane and 1,1-di-p-tolylethane was passed over the same three catalysts at about 450° C., 265 p. s. i. g. pressure, 5 moles of added hydrogen to each mole of ditolylethane, and an LHSV of 10, the conversion of methylcyclohexane to toluene was about 67% and of ditolylethane to ethyltoluene and toluene was about 95%, with a substantial balance between the exothermal and endothermal reactions. A particular advantage of this embodiment of the invention is that the initial aromatic compound, such as toluene or a xylene, is readily prepared from the corresponding naturally ocurring naphthene, such as methylcyclohexane or dimethylcyclohexane, in the same equipment and concurrently with cracking of the diarylalkane (ditolylethane or dixylylethane). This avoids the necessity for providing toluene or xylene from another source or for providing a separate unit for the dehydrogenation of the methylcyclohexane or dimethylcyclohexane. Furthermore, since paraffin hydrocarbons are largely inert diluents in both the catalytic cracking and the alkylation, a prior clean separation between the naphthene and/or corresponding aromatic and the paraffins is not necessary, hence materially simplifying the toluene or xylene recovery method. This method of operation is particularly advantageous for use where the naphthene is available and it is not being used for aromatic (toluene or xylene) production as an independent operation.

A suitable application of this aspect of the invention comprises: (1) preparation of a suitable petroleum naphtha fraction, as by distillation, containing the required naphthene (methylcyclohexane-MCH), which fraction will normally contain a substantial proportion of similar boiling paraffins; (2) mixing the naphthene (MCH) fraction with a quantity of a corresponding diarylalkane (ditolylethane) which is made in the process; (3) subjecting the mixture to hydrocracking as already described to produce a mixture of corresponding aromatic (toluene) and ethylaromatic (ethyltoluene) compounds, said paraffins and unconverted naphthene and diarylalkane; (4) separating (a) paraffins (b) aromatic (toluene), (c) ethylaromatic (ethyltoluene) and diarylalkane as separate distillation fractions; (5) utilizing the aromatic (toluene) fraction as aromatic source for the alkylation of aromatic (e. g. with acetaldehyde or acetylene) to the corresponding diarylalkane, and recycling unconverted diarylalkane to the hydrocracking zone. Although any unconverted naphthene may be recovered and recycled in the process, it is generally more economical to permit that portion, which distills with the paraffins, to go to other utility. The naphthenes fraction and diarylalkane are preferably mixed in the second step in proportions such as will result in the production of one mole of aromatic (toluene) from naphthene (MCH) for each mole of aromatic (toluene) resulting from the cracking of diarylalkane. This, of course, depends on the concentration of naphthene in the naphthene fraction, and the relative percentage conversions of naphthene and of diarylalkane compounds. Where it is not desirable to utilize a naphthene fraction as the sole direct source of aromatics in the process, a portion of the aromatic is suitably provided from an independent source.

This process finds application especially in the production of ethylbenzene from naphtha streams which contain suitable quantities of cyclohexane and avoids the necessity for separately producing and recovering the benzene. In general, it is of utility in the production of ethyl-aromatic hydrocarbons from corresponding naphthenes, particularly the monocyclic naphthenes, such as ethylbenzene from cyclohexane, ethyltoluene from methylcyclohexane, and the ethylxylenes from the dimethylcyclohexanes.

I claim as my invention:

1. A process for the production of $C_2$ substituted aromatic hydrocarbons which comprises the catalytic cracking of 1,1-diarylalkane hydrocarbons containing two aryl-substituents on the same carbon atom of an alkane hydrocarbon containing at least two carbon atoms, in the presence of at least one mole of hydrogen per mole of diarylalkane hydrocarbon and a composite catalyst of a high-melting inorganic substance having acidic properties and a dehydrogenation catalyst at a temperature of at least 300° C. and a pressure between 0 p. s. i. g. and about 700 p. s. i. g.

2. A process in accordance with claim 1, wherein the inorganic acidic portion of the catalyst is selected from the group consisting of inorganic oxides and inorganic sulfides.

3. A process in accordance with claim 1, wherein the catalyst is a platinum siliceous composite.

4. A process in accordance with claim 1, wherein the catalyst is a nickel-acidic clay composite.

5. A process in accordance with claims 1, wherein the catalyst is a tungsten-nickel-sulfide catalyst.

6. A process in accordance with claim 1, wherein the diarylalkane is a 1,1-diarylethane.

7. A process according to claim 1, wherein the diarylalkane is a 1,1-diphenylethane hydrocarbon.

8. A process according to claim 1, wherein the diarylalkane is a 1,1-di(alkylphenyl)ethane.

9. A process for the production of a $C_2$ substituted aromatic hydrocarbon in which the $C_2$-aliphtic group is saturated, which comprises the catalytic cracking of a 1,1-diarylalkane hydrocarbon containing two aryl substiutents on the same carbon atom of an alkane hydrocarbon having at least two carbon atoms, in the presence of at least ten moles of hydrogen per mole of diarylalkane hydrocarbon and a composite catalyst of a high-melting inorganic substance having acidic properties and a dehydrogenation catalyst at a temperature of at least 300° C. and a pressure between 100 p. s. i. g. and about 700 p. s. i. g.

10. A process for the production of p-ethyltoluene which comprises the catalytic cracking of 1,1-di-p-tolylethane in the presence of at least ten moles of hydrogen per mole of the ditolylethane and a composite catalyst of a high-melting inorganic substance having acidic properties and a dehydrogenation catalyst at an elevated temperature of at least 300° C. and a pressure between 100 p. s. i. g. and about 700 p. s. i. g. to convert at least 50% of said 1,1-di-p-tolylethane to p-ethyltoluene and toluene.

11. A process in accordance with claim 10, wherein the catalyst is a platinum-siliceous composite.

12. A process in accordance with claim 10, wherein the catalyst is a nickel-acidic clay composite.

13. A process in accordance with claim 10, wherein the catalyst is a tungsten-nickel-sulfide catalyst.

14. A process for the production of a $C_2$ substituted aromatic hydrocarbon in which the $C_2$-aliphatic group is unsaturated which comprises the catalytic cracking of a 1,1-diarylalkane hydrocarbon containing two aryl substituents on the same carbon atom of an alkane hydrocarbon having at least two carbon atoms, in the presence of at least one mole of hydrogen per mole of diarylalkane hydrocarbon and a composite catalyst of a high-melting inorganic substance having acidic properties and a dehydrogenation catalyst at a temperature of at least 300° C. and at substantially atmospheric pressure.

15. A process for the production of p-methylstyrene which comprises the catalytic cracking of 1,1-di-p-tolylethane in the presence of at least one mole of hydrogen per mole of the ditolylethane and a nickel-acidic clay catalyst at an elevated temperature of at least 300° C. and at substantialy atmospheric pressure.

16. A process for the production of $C_2$ substituted aromatic hydrocarbons which comprises the catalytic cracking of a 1,1-diarylethane hydrocarbon in the presence of at least one mole of hydrogen and at least one mole of steam per mole of the diarylethane, the mole ratio of hydrogen to steam being in the range from 1:10 to 10:1, and in the presence of a composite catalyst of a high-melting inorganic substance having acidic properties and a dehydrogenation catalyst at a temperature of at least 300° C. and a pressure between 0 p. s. i. g. and about 700 p. s. i. g.

17. A process for the production of $C_2$ substituted aromatic hydrocarbons which comprises the catalytic cracking, to form a $C_2$ substituted aromatic hydrocarbon and equimolar amounts of a non-$C_2$ substituted benzene hydrocarbon as cracking products, of a 1,1-diarylethane hydrocarbon admixed with an essentially equimolar proportion of a naphthene corresponding to said non-C$_2$ substituted benzene hydrocarbon in the presence of at least one mole of hydrogen per mole of the diarylethane and in the presence of a composite catalyst of a high-melting inorganic substance having acidic properties and a dehydrogenation catalyst at a temperature of at least about 300° C. and at a pressure between 0 p. s. i. g. and about 700 p. s. i. g., fractionating the resulting reaction mixture and recovering a fraction comprising corresponding benzene hydrocarbon derived from both the diarylethane hydrocarbon and the naphthene.

18. A process for the production of C$_2$ substituted aromatic hydrocarbons which comprises the catalytic cracking, to form a C$_2$ substituted aromatic hydrocarbon and equimolar amounts of a non-C$_2$ substituted benzene hydrocarbon as cracking products, of a 1,1-diarylethane hydrocarbon admixed with an essentially equimolar proportion of a naphthene corresponding to said non-C$_2$ substituted benzene hydrocarbon in the presence of at least one mole of hydrogen per mole of the diarylethane and in the presence of a composite catalyst of a high-melting inorganic substance having acidic properties and a dehydrogenation catalyst at a temperature of at least about 300° C. and at a pressure between 0 p. s. i. g. and about 700 p. s. i. g., fractionating the resulting reaction mixture and recovering a fraction comprising corresponding benzene hydrocarbon derived from both the diarylethane hydrocarbon and the naphthene, alkylating this fraction with acetaldehyde to produce a further quantity of said 1,1-diarylethane, and utilizing this diarylethane as feed to the catalytic cracking as set forth hereinbefore.

19. A process in accordance with claim 18, wherein the diarylethane hydrocarbon is 1,1-di-p-tolylethane and the naphthene is methylcyclohexane, and wherein the catalyst is a nickel-acidic clay composite.

20. A process for the production of p-ethyltoluene which comprises the catalytic cracking of 1,1-di-p-tolylethane admixed with an essentially equimolar proportion of methylcyclohexane in the presence of about five moles of added hydrogen per mole of ditolylethane and in the presence of a nickel-acidic clay composite catalyst at a temperature of about 450° C. and a pressure of about 265 p. s. i. g., fractionating the resulting reaction mixture and recovering a fraction comprising toluene derived from both the ditolylethane and the methylcyclohexane, alkylating this fraction with acetaldehyde to produce a further quantity of said 1,1-di-p-tolylethane and utilizing this ditolylethane as feed to the catalytic cracking as set forth hereinbefore.

References Cited in the file of this patent

UNITED STATES PATENTS

| | | |
|---|---|---|
| 1,788,847 | Schoeller et al. | Jan. 13, 1931 |
| 1,805,555 | Schoeller et al. | May 19, 1931 |
| 2,338,973 | Schmerling | Jan. 11, 1944 |
| 2,381,522 | Stewart | Aug. 7, 1945 |
| 2,420,689 | Sturrock et al. | May 20, 1947 |
| 2,422,164 | Dixon | June 10, 1947 |
| 2,422,171 | Saunders | June 10, 1947 |
| 2,438,570 | Mattox | Mar. 30, 1948 |
| 2,470,092 | Corson et al. | May 17, 1949 |
| 2,500,369 | McCoubrey et al. | Mar. 14, 1950 |
| 2,703,308 | Oblad et al. | Mar. 1, 1955 |

OTHER REFERENCES

Morton et al., Canadian Journal of Research, vol. 26, Sec. B, 1948, pages 581–591.

May et al., Discussions of the Faraday Society, vol. 8, 1950, pages 290–296.